United States Patent [19]

Eckler

[11] Patent Number: 4,724,083
[45] Date of Patent: Feb. 9, 1988

[54] METHOD OF PREVENTING PRECIPITATION OF METAL COMPOUNDS

[75] Inventor: Paul E. Eckler, Terre Haute, Ind.

[73] Assignee: International Minerals & Chemical Corp., Terre Haute, Ind.

[21] Appl. No.: 50,009

[22] Filed: May 15, 1987

[51] Int. Cl.$^4$ .............................................. C02F 5/10
[52] U.S. Cl. ................................... 210/698; 252/180; 422/17
[58] Field of Search ............... 210/696, 698; 252/180, 252/181; 422/16, 17

[56] References Cited

U.S. PATENT DOCUMENTS

| | | | |
|---|---|---|---|
| 865,700 | 9/1907 | Hernsheim et al. | 252/142 X |
| 3,003,898 | 10/1961 | Reich | 252/142 X |
| 3,211,659 | 10/1965 | Pikaar | 252/142 X |
| 3,294,689 | 12/1966 | Pierce | 252/180 X |
| 3,510,351 | 5/1970 | Van Dillen et al. | 252/180 X |
| 3,696,044 | 10/1972 | Rutledge | 210/698 X |
| 3,996,144 | 12/1976 | Weetman | 252/396 X |
| 4,048,065 | 9/1977 | Suen et al. | 210/698 |
| 4,129,423 | 12/1978 | Rubin | 252/82 X |
| 4,377,484 | 3/1983 | Nasrallah | 210/698 |
| 4,595,517 | 6/1986 | Abadi | 252/180 X |

Primary Examiner—Tom Wyse
Attorney, Agent, or Firm—Robert H. Dewey; Thomas L. Farquer

[57] ABSTRACT

A method for inhibiting the precipitation under alkaline conditions of metal compounds from a solution containing them by the step of adding dimethylolpropionic acid in metal precipitation-inhibiting amounts.

11 Claims, No Drawings

METHOD OF PREVENTING PRECIPITATION OF METAL COMPOUNDS

This invention relates to a method of preventing precipitation of metal compounds under alkaline conditions. In a particular aspect, this invention relates to a method for preventing precipitation of aluminum, iron and other heavy metal compounds under alkaline conditions.

BACKGROUND OF THE INVENTION

Naturally-occurring water supplies often contain dissolved minerals to varying degrees. Such minerals include dissolved salts of aluminum, iron, chromium, zinc, manganese, nickel and cobalt. It is customary to filter such water supplies, especially if they contain suspended solids, but filtration does not remove dissolved salts. When the water is later used in such processes as laundries, dishwashing, bottle-washing, etc. where alkaline detergents, builders and the like are employed, the metal ion may precipitate as the hydroxide and stain any fabrics, glassware, etc. which it contacts. Thus a need exists for a method of inhibiting precipitation of such metals under alkaline conditions.

SUMMARY OF THE INVENTION

It is an object of this invention to provide a method for preventing precipitation of metal compounds under alkaline conditions.

It is another object of this invention to provide a method for preventing precipitation of aluminum, iron and other heavy metal compounds at alkaline pH.

Other objects will be apparent to those skilled in the art from the disclosure herein.

It is the discovery of this invention to provide a method for inhibiting the precipitation of metal compounds from a solution containing them under alkaline conditions by the step of adding dimethylolpropionic acid (DMPA) in metal precipitation-inhibiting amounts.

DETAILED DESCRIPTION

According to the process of this invention, the DMPA is added to the metal-containing solution in precipitation-inhibiting amounts. Sequestration (or chelation) takes place and the treated water can then be used under alkaline conditions without risk of precipitation of the iron or other compounds.

The term "precipitation-inhibiting amounts" is not intended to be limiting. The amount of metal ions present in the water supply can vary widely and can be determined only by analytical methods. However most users are not equipped to conduct such analytical studies. Accordingly the amount of DMPA to be used is arbitrary in most cases. It is contemplated that in most instances, the addition of sufficient DMPA to provide a concentration of about 1% by weight will be sufficient. However as little as 0.01% may be sufficient or as much as 10% by weight may be required.

Metal ions which can be sequestered (or chelated) by DMPA include aluminum, iron, chromium, zinc, manganese, nickel and cobalt. Metal ions which are not sequestered by DMPA include sodium, potassium, calcium and magnesium. The acidic water employed in the practice of this invention can be normally mildly acidic wherein the acidity is due to dissolved $CO_2$, e.g. about pH 6.0, or it can be more acidic, e.g. from about 1.0 to 6.0. Such waters are normally converted to alkaline pH under use conditions. In the absence of DMPA, ferric hydroxide and other hydroxides would precipitate, but in the presence of DMPA, precipitation does not occur.

The mechanism of action is not fully understood but it is believed that DMPA acts as a sequestering agent or chelating agent and thus effectively complexes the metal ion. It is contemplated that the invention will most often be used in treating water supplies where the water is intended for non-human consumption. A typical application would be in treating iron-containing water for use in laundries. In some areas of the country, acidic well waters contain appreciable amounts of dissolved iron which precipitates as the hydroxide in the presence of common detergents and discolors white and light-colored fabrics. It is also contemplated that the invention will be useful with bottle washing compounds, in cleaning compounds for rust removal, in steel pickling for removal of oxide films and in processes for cleaning boiler steam tubes.

The DMPA can be conveniently added to the water supplies to be treated by any suitable method, many of which are known. One convenient method is to form a pre-mix of DMPA with a detergent, or a builder, or it can be added as an aqueous solution. The invention is not to be limited by the form in which the DMPA is added.

The invention will be better understood with reference to the following examples. These examples are intended to illustrate the invention and it is not intended that the invention be limited thereby.

EXAMPLE 1

An aqueous solution containing 100 ppm of ferric chloride was prepared. The pH was 0.4. To half of the solution there was added DMPA in a quantity sufficient to provide 1% by weight. Both parts of the solution were then titrated with 0.1 N sodium hydroxide solution to pH of 11.0. The solution without DMPA developed a gelatinous precipitate within 5 minutes. The solution with DMPA remained free from precipitation.

EXAMPLE 2

The experiment of example 1 is repeated in all essential details except that aluminum chloride is substituted for ferric chloride. The solution with DMPA remains free from a precipitate.

EXAMPLE 3

The experiment of example 1 is repeated in all essential details except that chromium chloride is substituted for ferric chloride. The solution with DMPA remains free from a precipitate.

EXAMPLE 4

The experiment of example 1 is repeated in all essential details except that zinc chloride is substituted for ferric chloride. The solution with DMPA remains free from a precipitate.

EXAMPLE 5

The experiment of example 1 is repeated in all essential details except that manganese chloride is substituted for ferric chloride. The solution with DMPA remains free from a precipitate.

EXAMPLE 6

The experiment of example 1 is repeated in all essential details except that nickel chloride is substituted for ferric chloride. The solution with DMPA remains free from a precipitate.

EXAMPLE 7

The experiment of example 1 is repeated in all essential details except that cobalt chloride is substituted for ferric chloride. The solution with DMPA remains free from a precipitate.

I claim:

1. A method for inhibiting precipitation of ions of aluminum and heavy metal compounds selected from the group consisting of iron, chromium, zinc, manganese, nickel and cobalt from water supplies containing them comprising the step of adding to the water dimethylolpropionic acid in an amount of from about 0.01 to 10% by weight.

2. The method of claim 1 wherein the water is intended for use in a laundry.

3. The method of claim 1 wherein the water is intended for use in a steel pickling bath.

4. The method of claim 1 wherein the water is intended for use in a bottle washing process.

5. The method of claim 1 wherein the metal ion is aluminum.

6. The method of claim 1 wherein the metal ion is iron.

7. The method of claim 1 wherein the metal ion is chromium.

8. The method of claim 1 wherein the metal ion is zinc.

9. The method of claim 1 wherein the metal ion is manganese.

10. The method of claim 1 wherein the metal ion is nickel.

11. The method of claim 1 wherein the metal ion is cobalt.

* * * * *